(12) United States Patent
Yamaichi et al.

(10) Patent No.: US 8,375,317 B2
(45) Date of Patent: Feb. 12, 2013

(54) MOTOR CONTROL CHARACTERISTIC EVALUATION DEVICE AND MOTOR CONTROL CHARACTERISTIC PRESENTATION METHOD

(75) Inventors: Yukihiro Yamaichi, Osaka (JP); Toru Tazawa, Osaka (JP); Ken'ichi Suzuki, Osaka (JP)

(73) Assignee: Panasonic Corporation, Osaka (JP)

( * ) Notice: Subject to any disclaimer, the term of this patent is extended or adjusted under 35 U.S.C. 154(b) by 380 days.

(21) Appl. No.: 12/865,113

(22) PCT Filed: Jan. 27, 2009

(86) PCT No.: PCT/JP2009/000300
§ 371 (c)(1),
(2), (4) Date: Jul. 28, 2010

(87) PCT Pub. No.: WO2009/096169
PCT Pub. Date: Aug. 6, 2009

(65) Prior Publication Data
US 2010/0333010 A1    Dec. 30, 2010

(30) Foreign Application Priority Data
Jan. 29, 2008    (JP) .................................. 2008-017763

(51) Int. Cl.
*G06F 3/048* (2006.01)
*G05B 11/32* (2006.01)
(52) U.S. Cl. ........................................ 715/771; 318/625
(58) Field of Classification Search .................. 715/771, 715/778, 761, 764; 318/625
See application file for complete search history.

(56) References Cited

U.S. PATENT DOCUMENTS

| | | | |
|---|---|---|---|
| 6,535,788 B1* | 3/2003 | Yoshida et al. | 700/191 |
| 6,553,298 B2* | 4/2003 | Smythe | 701/49 |
| 2002/0172510 A1* | 11/2002 | Kobayashi et al. | 388/800 |
| 2004/0181323 A1* | 9/2004 | Yuan et al. | 701/22 |
| 2004/0257022 A1* | 12/2004 | Trifilo | 318/625 |
| 2006/0285596 A1* | 12/2006 | Kondo et al. | 375/240.16 |

FOREIGN PATENT DOCUMENTS

| | | |
|---|---|---|
| JP | 09-311714 A | 12/1997 |
| JP | 11-040321 A | 2/1999 |
| JP | 2000-122713 A | 4/2000 |
| JP | 2001-022434 A | 1/2001 |
| JP | 2001-075637 A | 3/2001 |
| JP | 2004-133588 A | 4/2004 |

OTHER PUBLICATIONS

International Search Report for counterpart International Application No. PCT/JP2009/000300, dated Apr. 14, 2009, 2 pages.

* cited by examiner

*Primary Examiner* — Tadeese Hailu
(74) *Attorney, Agent, or Firm* — Brinks Hofer Gilson & Lione

(57) ABSTRACT

An evaluation index selection section in which any evaluation index is selected from a plurality of evaluation indices of the control characteristics in the motor control system and which outputs selection information indicating the selected evaluation index; a relational data extraction section for extracting data related to the selected evaluation index from a data group of the motor control system based on the selection information; an evaluation value calculation section for calculating an evaluation value of the evaluation index based on the extracted data; and a display control section for displaying the calculated evaluation value on a display are included.

14 Claims, 13 Drawing Sheets

Selection of evaluation indices
- ● Settling time
- ○ Rise time
- ○ Delay time
- ○ Overshoot
- ○ Attenuation ratio
- ○ Steady-state deviation
- ○ Speed variation
- ○ Torque variation
- ○ Oscillation period
- ○ Oscillation frequency
- ○ Oscillation amplitude

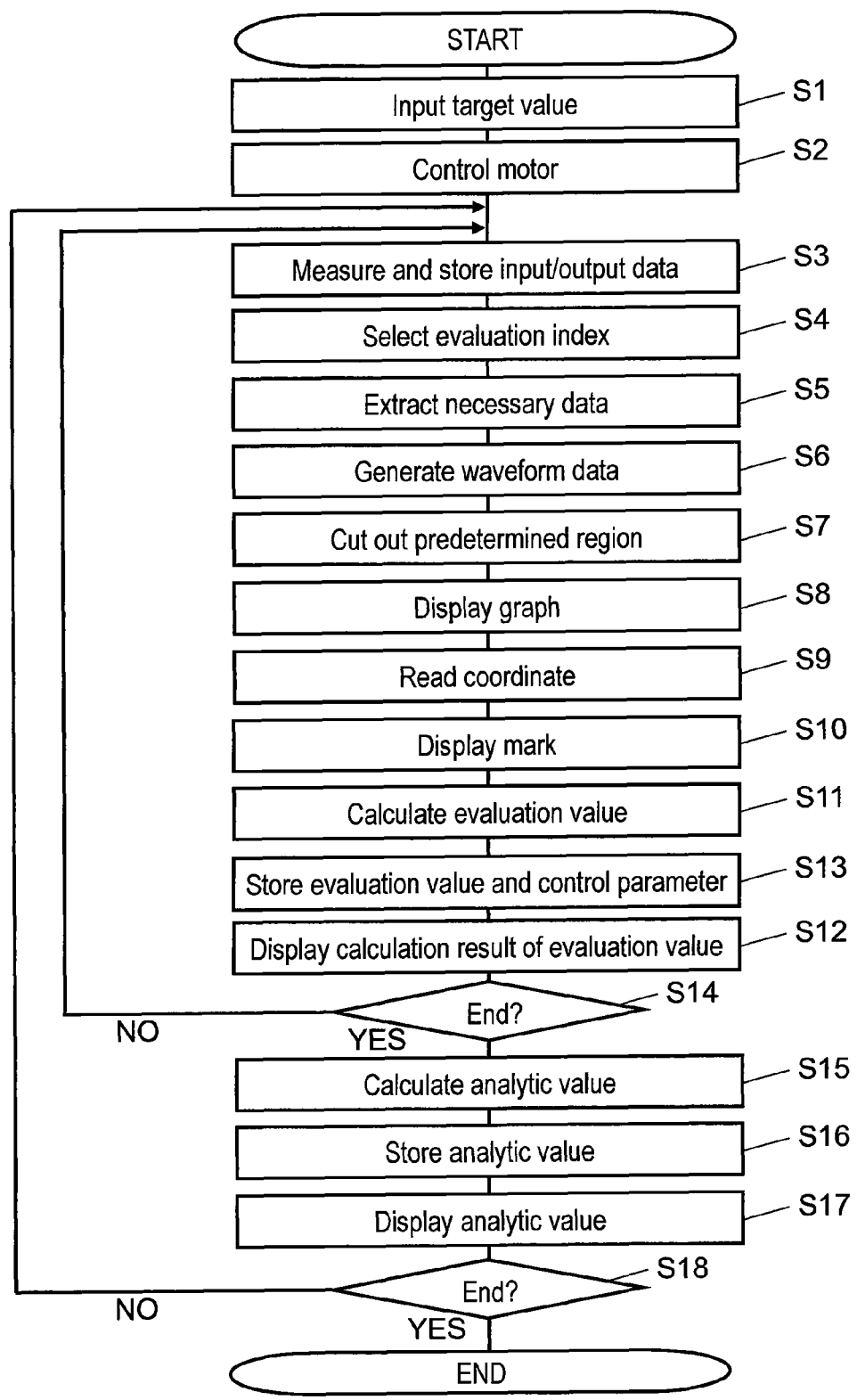

MOTOR CONTROL CHARACTERISTIC EVALUATION DEVICE AND MOTOR CONTROL CHARACTERISTIC PRESENTATION METHOD

TECHNICAL FIELD

The present invention relates to a motor control characteristic evaluation device and a motor control characteristic presentation method, which present information about control characteristics of a motor control system including a subject such as a motor to be controlled and a controller for controlling the subject to a user and which are used for evaluation of the control characteristics of the motor.

BACKGROUND ART

In such technologies, a technology described in, for example, Patent Document 1 is known. The invention described in Patent Document 1 includes a maintenance device for managing an input signal from an encoder, a control signal to a servo motor, a control signal from a high-order control device, and an internal signal of a servo amplifier in the process of generating the control signal to the servo motor, which are collected in a constant cycle. The maintenance device carries out abnormality monitoring of the servo amplifier, and concurrently outputs an operation parameter to the servo amplifier, controls an operation of the servo amplifier, and allows the servo amplifier to collect predetermined signals. The maintenance device displays, for example, a change of the collected information in a line chart based on the collected information. Then, the maintenance device stops collecting information about the servo amplifier when the received collected information satisfies the preset stop condition.

However, according to the invention described in Patent Document 1, data to be collected must be set in advance. Therefore, when data to be extracted are changed, selection itself of necessary data is required to be changed. In particular, in controlling a motor, various evaluation indices for quantitatively evaluating control characteristics of a motor control system have been proposed. When an evaluation value based on such evaluation indices is intended to be calculated, a different calculation method for each evaluation index is necessary. In addition, data corresponding to the calculation method are required to be selected in measurement. Therefore, when an evaluation index is changed, an operator is required to have knowledge and skill to select data necessary for calculation of the evaluation value.
[Patent Document 1] Japanese Patent Unexamined Publication No. 2001-75637

SUMMARY OF THE INVENTION

A motor control characteristic evaluation device of the present invention has a function of presenting control characteristics of a motor control system. The device includes an evaluation index selection section in which any evaluation index is selected from a plurality of evaluation indices of the control characteristics and which outputs selection information indicating the selected evaluation index; a relational data extraction section for extracting data related to the selected evaluation index from a data group of the motor control system based on the selection information; an evaluation value calculation section for calculating an evaluation value of the evaluation index based on the extracted data; and a display control section for displaying the calculated evaluation value on a display.

Furthermore, a motor control characteristic presentation method of the present invention is a method of presenting control characteristics of a motor control system. The method includes selecting any evaluation index from a plurality of evaluation indices of the control characteristics; extracting data related to the selected evaluation index from a data group of the motor control system; calculating an evaluation value of the evaluation index based on the extracted data; and displaying the calculated evaluation value on a display.

With such a configuration, in the motor control characteristic evaluation device and the motor control characteristic presentation method of the present invention, since data necessary for calculation of an evaluation value of the selected evaluation index are automatically extracted, a user is not required to select input/output data according to the evaluation index. Thus, the evaluation value of the evaluation index can be easily presented.

BRIEF DESCRIPTION OF THE DRAWINGS

FIG. 5 is a view showing an example of an evaluation index selection image, displaying a plurality of evaluation indices.

FIG. 17 is another processing flow chart of a motor control characteristic evaluation device and a servo motor control device, in which loop processing is carried out and which includes an analysis step, an analysis display step, and an analytic value storage step.

REFERENCE MARKS IN THE DRAWINGS

| | |
|---|---|
| 21 | display |
| 22 | motor control characteristic evaluation device |
| 41 | input section |
| 51 | servo motor control device |
| 52, 220 | CPU |
| 53, 221 | ROM |
| 54, 222 | RAM |
| 55 | communication cable |
| 61 | motor |
| 71 | loading machine |
| 72 | base |
| 73 | ball screw |
| 74 | table |
| 81 | rotation detector |
| 90 | mark |
| 91 | result |
| 100 | predetermined region |
| 101 | motor control system |
| 123, 223 | input/output data measurement section |
| 124, 224 | display control section |
| 125, 225 | extraction control section |
| 126, 226 | relational data extraction section |
| 127, 227 | waveform data generating section |
| 140, 240 | evaluation value calculation section |
| 141 | input/output data storage section |
| 142 | corresponding table |
| 143, 243 | display data generating section |
| 228 | region cut-out section |
| 229 | graph display section |
| 230 | point selection section |
| 231 | point coordinate reading section |
| 232 | mark display section |

DETAILED DESCRIPTION OF THE PREFERRED EMBODIMENT

Hereinafter, exemplary embodiments of the present invention are described with reference to drawings.

First Exemplary Embodiment

Figure 1:
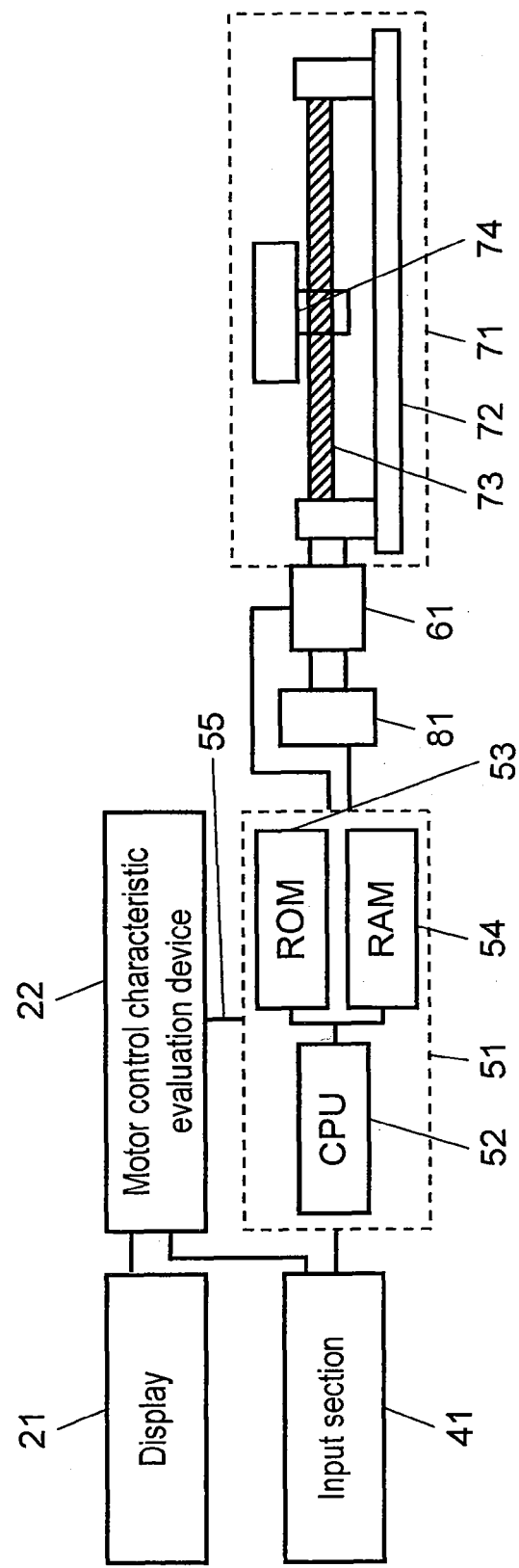
FIG. 1 is a diagram showing a configuration of a servo motor system including a motor control characteristic evaluation device in accordance with a first exemplary embodiment of the present invention.

FIG. 1 is a diagram showing a configuration of a servo motor system including a motor control characteristic evaluation device in accordance with a first exemplary embodiment of the present invention.

In the servo motor system shown in FIG. 1, servo motor control device 51 applied in this exemplary embodiment includes ROM 53, RAM 54, and CPU 52, and controls the rotation of motor 61. ROM 53 is a memory in which an operation program necessary for controlling the device is stored. RAM 54 is a memory in which data and the like are temporarily stored at the time of controlling. CPU 52 is a processor that executes a logical operation.

Motor 61 drives loading machine 71 so that table 74 moves via ball screw 73 that is rotatably fixed on base 72. Motor 61 is provided with rotation detector 81 for detecting data such as rotation positions, speeds, or the like, and notifying servo motor control device 51 of the detected data. Motor 61 and rotation detector 81 are electrically connected to servo motor control device 51. Thereby, the rotation of motor 61 is controlled. Furthermore, servo motor control device 51 is connected to external input section 41 in which a target value is set based on an input signal from the outside. Servo motor control device 51 controls the rotation of motor 61 according to the target value. For example, a value corresponding to a position of table 74 as the target value is input from input section 41. Then, servo motor control device 51 controls the rotation of motor 61 so that table 74 comes in the position with reference to detection data from rotation detector 81.

Motor control characteristic evaluation device 22 is connected to servo motor control device 51 via communication cable 55 such as an RS-485 cable, an RS-232C cable, and a USB cable. Furthermore, motor control characteristic evaluation device 22 receives instruction information from a user via input section 41, and at the same time, displays results of calculated motor control characteristics on display 21.

Figure 2:
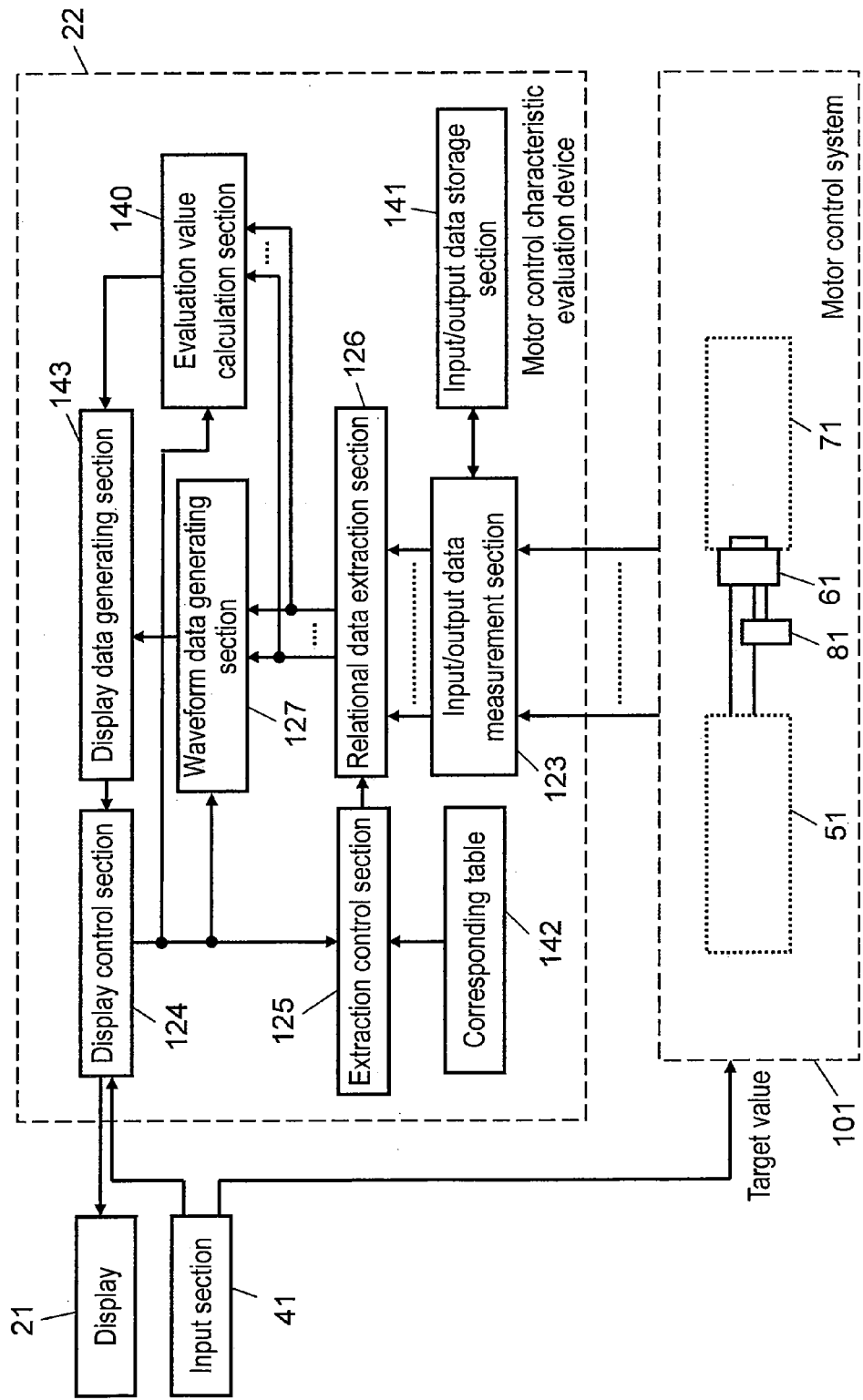
FIG. 2 is a diagram showing a configuration of the motor control characteristic evaluation device.

FIG. 2 is a diagram showing a configuration of motor control characteristic evaluation device 22 in accordance with the first exemplary embodiment of the present invention. As described hereinafter, motor control characteristic evaluation device 22 has a function of presenting motor control characteristics as control characteristics of a motor control system. Furthermore, FIG. 2 shows a configuration of motor control characteristic evaluation device 22 connected to motor control system 101 including servo motor control device 51.

In FIG. 2, input/output data measurement section 123 measures input/output data in each processing of motor control system 101 as a measurement data group in a constant cycle, and takes the measured input/output data. Examples of the input/output data include speed command data and position command data input as target values from input section 41, speed detection data and position detection data input from rotation detector 81, operation data operated in servo motor control device 51, and the like. Furthermore, examples of the input/output data may also include data from, for example, a sensor attached to loading machine 71. Input/output data measurement section 123 stores these taken data in input/output data storage section 141.

Meanwhile, display control section 124 receives instruction information from input section 41 and controls display 21 to display an image in response to, for example, the instruction information on display 21. That is to say, for example, when a user instructs, via input section 41, to display a motor control characteristic (hereinafter, appropriately referred to as a "control characteristic"), an image about the instructed control characteristic is displayed by display control section 124. Such image data to be displayed are generated by display data generating section 143. Furthermore, in particular, when an evaluation value of an evaluation index of the control characteristic is instructed to be displayed, display control section 124 notifies extraction control section 125, waveform data generating section 127 and evaluation value calculation section 140 of instruction information indicating what evaluation index is instructed.

Specifically, firstly, display control section 124 displays an evaluation index selection image on display 21 so that a user selects any evaluation index from a plurality of evaluation indices. When the user selects a desired evaluation index, display control section 124 notifies selection information indicating the evaluation index selected by the user as the above-mentioned instruction information. Thus, display control section 124 has a function as an evaluation index selection section in which any evaluation index is selected from a plurality of evaluation indices of the control characteristics, and which outputs selection information indicating the selected evaluation index. Hereinafter, an example in which display control section 124 notifies selection information indicating a selected evaluation index is described. In this exemplary embodiment, as the evaluation index, for example, a settling time, a rise time, a torque variation rate, and the like, used for evaluation of the control characteristics in motor control are described.

Extraction control section 125 controls relational data extraction section 126 based on the selection information notified from display control section 124. Extraction control section 125 firstly refers to corresponding table 142 based on the received selection information. In corresponding table 142, evaluation indices and input/output data segments each corresponding to an evaluation index are previously stored in a form of a table. That is to say, for one evaluation index, information indicating the input/output data segment related to the evaluation index is stored. A list of information is stored in corresponding table 142. For example, for a settling time as one evaluation index, a position command and a position output are stored as an input/output data segment; for a rise time, a position output is stored; for a torque variation rate, a torque output is stored. When, for example, a settling time is notified as the selection information, extraction control section 125 refers to corresponding table 142 and determines that an input/output data segment corresponding to the setting time is a position command and a position output. Extraction control section 125 notifies relational data extraction section 126 of the determined result. Concurrently, extraction control section 125 controls relational data extraction section 126 so that relational data extraction section 126 extracts necessary input/output data based on the determined result.

Relational data extraction section 126 extracts data related to the selected evaluation index, as extraction data, from input/output data that is a data group of motor control system 101 based on the selection information. That is to say, relational data extraction section 126 extracts data in the input/output data segment notified by extraction control section 125 from input/output data taken by input/output data measurement section 123 in response to the control of extraction control section 125, and takes the data as extraction data. Specifically, relational data extraction section 126 takes data in the input/output data segment from input/output data storage section 141 as extraction data via input/output data measurement section 123. For example, when a settling time is selected, relational data extraction section 126 takes time-series position command data and time-series position output data relating to the settling time as the extraction data. Relational data extraction section 126 supplies the extracted data, which has been taken, to waveform data generating section 127 and evaluation value calculation section 140.

Waveform data generating section 127 generates waveform data by using the time-series extracted data. Examples of the waveform data include data for displaying speed or position changing over time as waveform images. Waveform data generated by waveform data generating section 127 are supplied to display data generating section 143.

Evaluation value calculation section 140 calculates an evaluation value of an evaluation index based on the extracted data. That is to say, to evaluation value calculation section 140, selection information is notified from display control section 124 and extracted data are supplied from relational data extraction section 126. Evaluation value calculation section 140 calculates an evaluation value of the evaluation index corresponding to the selection information from display control section 124 by using the supplied extracted data. The evaluation value calculated by evaluation value calculation section 140 is notified to display data generating section 143.

Display data generating section 143 generates display data to be displayed on display 21 by using the waveform data supplied from waveform data generating section 127, the evaluation value notified from evaluation value calculation section 140 together with self-generated coordinate data for display. Furthermore, display data generating section 143 also generates display data for evaluation index selection image for selecting any evaluation index from a plurality of evaluation indices. The generated display data are supplied to display control section 124. Display control section 124 displays an image based on the display data on display 21. Display control section 124 displays an evaluation value as a numeric value on display 21 when the calculated evaluation value is notified from display data generating section 143.

With the above-described configuration of motor control characteristic evaluation device 22, when an evaluation index is selected, input/output data relating to the evaluation index are extracted. By using the extracted data, an evaluation value of the selected evaluation index is calculated and displayed on display 21. Thus, in this exemplary embodiment, input/output data necessary for calculation of an evaluation value of an evaluation index are automatically extracted by relational data extraction section 126. Therefore, a user is not required to select input/output data according to an evaluation index, so that an evaluation value of the evaluation index can be presented easily.

Furthermore, by image-displaying the waveform image generated in waveform data generating section 127 based on the extracted data and numerically displaying the evaluation value, the control characteristics of motor control system 101 together with the waveform are presented to a user. Therefore, the control characteristics are visually understandable, and thus the convenience in evaluation of the control characteristics can be enhanced.

In the above-description, an example in which motor control characteristic evaluation device 22 is configured by function blocks is described. However, for example, a configuration in which processing in each block is carried out by executing each step according to the procedure may be employed. Specifically, a program for sequentially executing steps corresponding to processing of the respective blocks is stored in, for example, a memory. Then, for example, a CPU such as a microprocessor sequentially reads out the program stored in the memory, and executes processing according to the read-out program. A configuration using such a processor may be employed.

Figure 3:
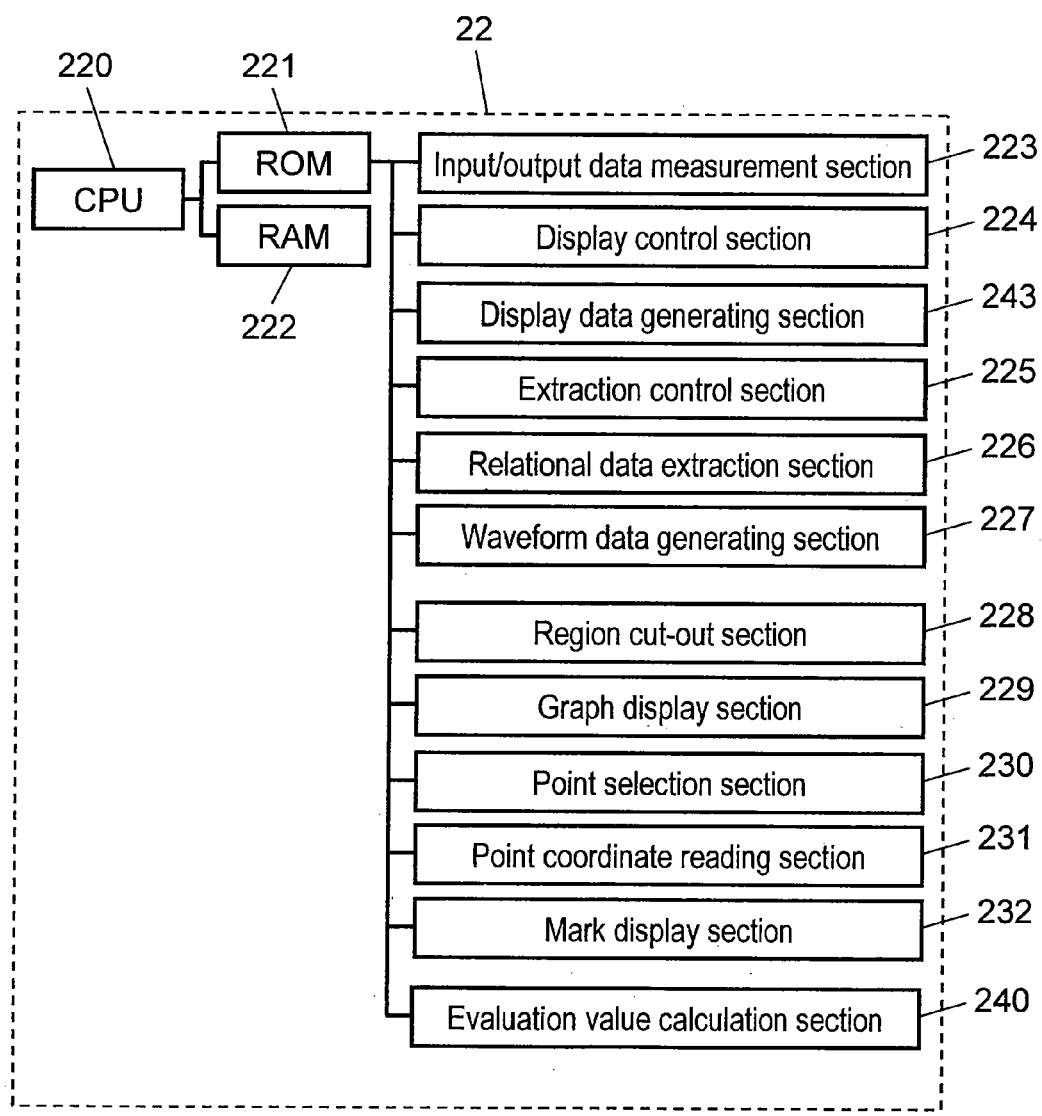
FIG. 3 is a diagram showing another configuration example of the motor control characteristic evaluation device.

FIG. 3 is a diagram showing another configuration of motor control characteristic evaluation device 22 in accordance with this exemplary embodiment. FIG. 3 shows an example of a configuration of motor control characteristic evaluation device 22 in which processing is executed according to a program as mentioned above. Hereinafter, the motor control characteristic evaluation device and the motor control characteristic presentation method in this exemplary embodiment are described based on motor control characteristic evaluation device 22 configured as shown in FIG. 3 is described.

Motor control characteristic evaluation device 22 shown in FIG. 3 includes ROM 221, RAM 222, and CPU 220. ROM 221 is a memory in which an operation program necessary for processing of the device is stored. RAM 222 is a memory in which data are temporarily stored during operation. CPU 220 is a processor for executing a logical operation. Furthermore, in ROM 221, programs for operating functions as input/output data measurement section 223, display control section 224, display data generating section 243, extraction control section 225, relational data extraction section 226, waveform data generating section 227, evaluation value calculation section 240, region cut-out section 228, graph displaying section 229, point selection section 230, point coordinate reading section 231, and mark display section 232 are stored. When FIG. 3 is compared with FIG. 2, input/output data measurement section 223 corresponds to input/output data measurement section 123, display control section 224 corresponds to display control section 124, display data generating section 243 corresponds to display data generating section 143, extraction control section 225 corresponds to extraction control section 125, relational data extraction section 226 corresponds to relational data extraction section 126, waveform data generating section 227 corresponds to waveform data generating section 127, and evaluation value calculation section 240 corresponds to evaluation value calculation section 140.

Input/output data measurement section 223 has a function of measuring input/output data of motor control system 101 including a controller for controlling a subject to be controlled and motor 61. Display control section 224 has a function of displaying, for example, evaluation values of one or more evaluation indices for evaluating the control characteristics of motor control system 101 on display 21. Furthermore, display control section 224 has a function of receiving instruction information from input section 41. Display data generating section 243 has a function of generating display data to be displayed on display 21. Extraction control section 225 has a function of controlling relational data extraction section 226 based on the selection information notified from display control section 224. Relational data extraction section 226 has a function of extracting data necessary for calculation of an evaluation value of the selected evaluation index from input/output data measured by input/output data measurement section 223 based on the control by extraction control section 225. Furthermore, waveform data generating section 227 has a function of generating waveform data from data extracted by relational data extraction section 226.

Furthermore, region cut-out section 228 has a function of cutting out a predetermined image region including a value necessary for calculation of an evaluation value from the waveform image based on the waveform data generated by waveform data generating section 227. Graph displaying section 229 has a function of displaying a waveform image in the image region cut out by region cut-out section 228 in a graph on display 21. Point selection section 230 has a function of automatically selecting a value to be used for calculation of the evaluation value. Point coordinate reading section 231 has a function of reading out a coordinate of the value to be used for calculation of the evaluation value. Mark display section 232 has a function of additionally displaying a mark on the value to be used for calculation of the evaluation value in the graph displayed by graph displaying section 229. Then, evaluation value calculation section 240 has a function of extracting only a value to be used for calculation of the evaluation value of the evaluation index selected based on the selection information and calculating the evaluation value by using the extracted value. It is preferable that a region selected by point selection section 230 is enlarged by display control section 224 so that a value to be used for calculation of the evaluation value is easily visible.

Hereinafter, a processing flow of motor control characteristic evaluation device 22 having the above-mentioned configuration is described.

Figure 4:
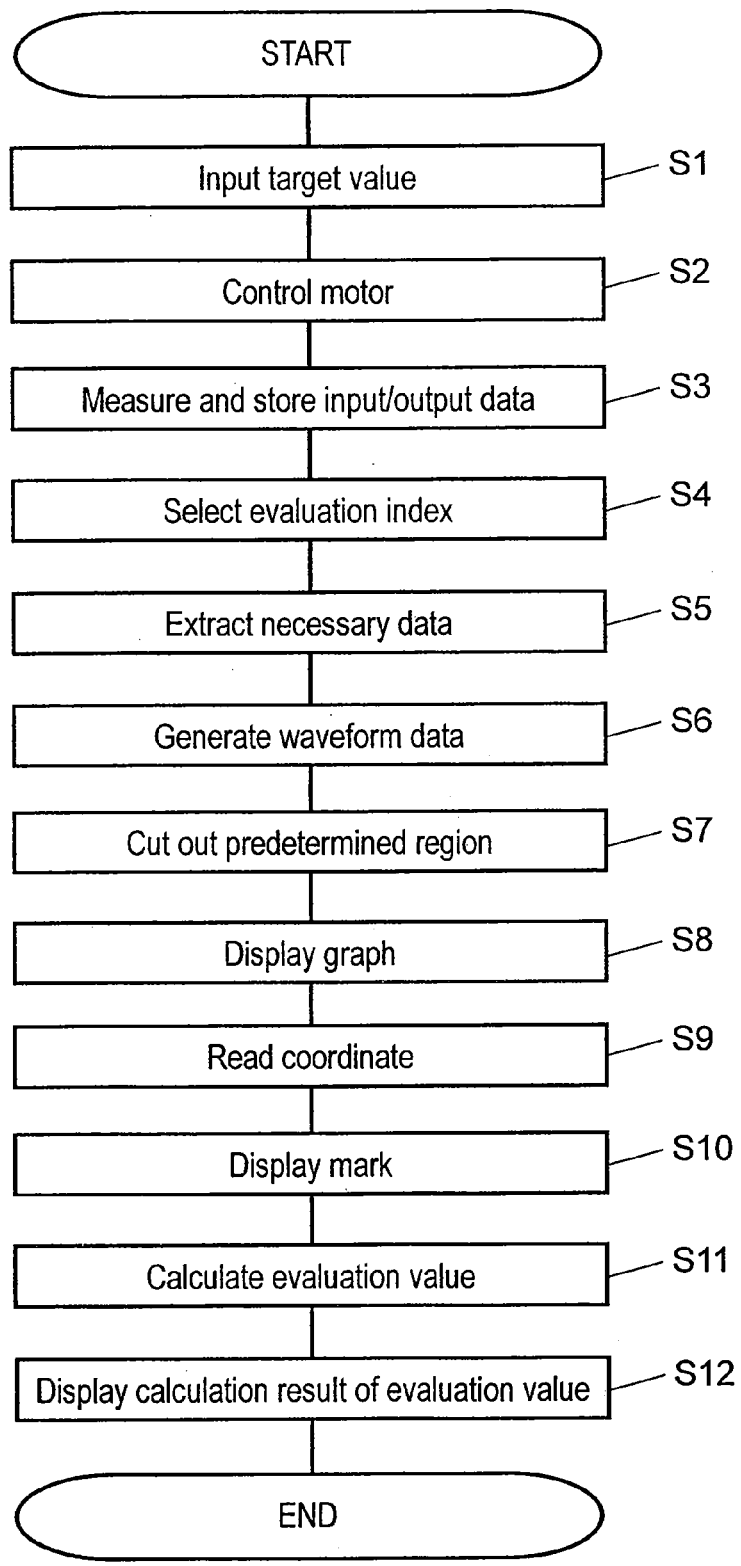
FIG. 4 is a processing flow chart of the motor control characteristic evaluation device.

FIG. 4 is a processing flow chart of motor control characteristic evaluation device 22 and servo motor control device 51 in accordance with the first exemplary embodiment of the present invention. The processing flow chart shown in FIG. 4 includes the motor control characteristic presentation method of the present invention. In this exemplary embodiment, CPU 52 of servo motor control device 51 executes step S1 and step S2 shown in FIG. 4, and CPU 220 of motor control characteristic evaluation device 22 executes steps after step S3. Thus, an evaluation value is calculated.

When motor control characteristic evaluation device 22 in accordance with this exemplary embodiment is operated, as shown in FIG. 4, firstly, a target value is input from input section 41 (step S1). Next, according to the target value input in step S1, the rotation of motor 61 is controlled (step S2).

After or concurrently with step S1 and step S2, input/output data of motor control system 101 are measured by input/output data measurement section 223. The measured data are stored in RAM 54 or RAM 222 that corresponds to input/output data storage section 141 in FIG. 2. Thus, input data input as the target value from input section 41, detection data from rotation detector 81, operation data in servo motor control device 51, and the like, are measured in a constant cycle and stored (step S3).

Next, a selection step in which any evaluation index is selected from a plurality of evaluation indices of the control characteristics is executed. That is to say, a necessary evaluation index is selected from a plurality of evaluation indices displayed on display 21 (step S4). Note here that the evaluation indices include a settling time, a rise time, a delay time, overshoot, a speed variation, a steady-state deviation, a torque variation, an oscillation period, an oscillation frequency, oscillation amplitude, and the like.

FIG. 5 is a view showing an example of an evaluation index selection image, displaying a plurality of evaluation indices. For example, in the case of manual operation, a user selects an evaluation index that is desired to be displayed from the selection image shown in FIG. 5.

Next, an extraction step of extracting data related to the evaluation index selected from a data group of motor control system 101 is executed. That is to say, when a desired evaluation index is selected, selection information indicating the selected evaluation index is notified to extraction control section 225. In response to this notification, extraction control section 225 controls relational data extraction section 226. With this control, relational data extraction section 226 extracts input/output data necessary for calculation of the evaluation value of the selected evaluation index. In this way, when the necessary evaluation index is selected in step S4, data necessary for calculation of the evaluation value of the selected evaluation index are extracted from input/output data stored in input/output data measurement section 223 (step S5).

Table 1 shows the relation between each of the evaluation indices and the corresponding input/output data necessary for calculation of the evaluation value. Corresponding table 142 in FIG. 2 stores information corresponding to Table 1 in advance. Furthermore, in the case of the configuration shown in FIG. 3, information corresponding to Table 1 may be stored in ROM 221 or RAM 222.

TABLE 1

| Evaluation index of control characteristic | Data necessary for calculation of evaluation value | |
| --- | --- | --- |
| | Position control | Speed control |
| Settling time | Position command, position output | Speed command, speed output |
| Command time | Position command | Speed command |
| Cycle time | Position command | Speed command |
| Rise time | Position output | Speed output |
| Delay time | Position command, position output | Speed command, speed output |

TABLE 1-continued

| Evaluation index of control characteristic | Data necessary for calculation of evaluation value | |
|---|---|---|
| | Position control | Speed control |
| Number of times at which a position is outside a settling range | Position command, position output | — |
| Number of times at which a speed is outside a settling range | — | Speed command, speed output |
| Overshoot | Position command, position output | Speed command, speed output |
| Attenuation ratio | Position command, position output | Speed command, speed output |
| Steady-state deviation | Position command, position output | Speed command, speed output |
| Speed variation | Position command, speed output | Speed command, speed output |
| Torque variation | Position command, torque output | Speed command, torque output |
| Oscillation period | Position output, speed output, torque output | Speed output, torque output |
| Oscillation frequency | Position output, speed output, torque output | Speed output, torque output |
| Oscillation amplitude | Position output, speed output, torque output | Speed output, torque output |
| Torque effective value | Position command, torque output | Speed command, torque output |

In the example of Table 1, a case of subjecting loading machine 71 to position control and a case of subjecting loading machine 71 to speed control are shown, respectively. Furthermore, in Table 1, the position command and the speed command may be, for example, target values of position and speed input from input section 41, and may be command data of position and speed calculated by an operation based on the target values input from input section 41. Furthermore, the position output, the speed output, and the torque output may be position detection data, speed detection data, or torque detection data, which are detected from, for example, rotation detector 81, respectively, or may be data corresponding to the present position, present speed, and present torque calculated by an operation by using the detection data detected from rotation detector 81. Furthermore, in this exemplary embodiment, all of the evaluation indices shown in Table 1 are not necessarily subjected. The evaluation index may be at least one of a command time, a settling time, a cycle time, a rise time, a delay time, a number of times at which a position is outside a settling range, a number of times at which a speed is outside a settling range, overshoot, an attenuation ratio, a steady-state deviation, a speed variation, a torque variation, an oscillation period of an output waveform, an oscillation frequency of an output waveform, oscillation amplitude of an output waveform, and a torque effective value shown in Table 1.

As shown in Table 1, when the position control is carried out and a settling time is selected as the evaluation index, position command data and position output data are extracted from the input/output data measured by input/output data measurement section 223. Furthermore, when the position control is carried out and a rise time is selected as the evaluation index, position output data are extracted from the input/output data measured by input/output data measurement section 223.

In Table 1, the settling time refers to the amount of time it takes for a difference between a position command and a position output to fall within a settling range after the position command is ended. In this exemplary embodiment, the settling range is made to be 10 pulses, but a configuration in which a user can set such a settling range may be employed.

Furthermore, the command time refers to the amount of time from the time when a position command or a speed command starts to the time when it is ended.

Furthermore, the cycle time refers to the amount of time from the time when a position command or a speed command starts and then is ended once to the time when a next position command or speed command starts.

Furthermore, the rise time refers to the amount of time required for a position output or a speed output to reach 10% to 90% of a constant value.

Furthermore, the delay time refers to the amount of time it takes for a position output or a speed output to reach 50% of the constant value from the initial time.

Furthermore, the "number of times at which a position is outside a settling range" refers to a number of times at which a difference between a position command and a position output falls within the settling range after the position command is ended and then the difference becomes larger than the settling range due to overshooting and the like.

Furthermore, the "number of times at which a speed is outside a settling range" refers to a number of times at which a difference between a speed command and a speed output falls within the settling range after the speed command reaches a constant value and then the difference becomes larger than the settling range due to overshooting and the like.

Furthermore, the overshoot refers to a maximum value when a difference between a position output or a speed output and a position command or a speed command reaches a maximum value after the position output or the speed output coincides with the position command or the speed command.

Furthermore, the attenuation ratio refers to a ratio of the first two one-side amplitudes when the oscillation monotonously decreases.

Furthermore, a steady-state deviation refers to a difference between a position command and a position output or a difference between a speed command and a speed output at the time when the position output or the speed output reaches a constant value.

Furthermore, the speed variation refers to a value calculated by dividing a difference between maximum value (Nmax) and minimum value (Nmin) of a speed output in a time region in which an amount of change of a position command or a speed command is a constant value by average value (Nave) of the speed output and expressed in percentage.

Furthermore, the torque variation refers to a value calculated by dividing a difference between maximum value (Nmax) and minimum value (Nmin) of a torque output in a time region in which an amount of change of a position command or a speed command is a constant value by rated torque (Trat) and expressed in percentage.

Furthermore, the oscillation period refers to a period when a position output waveform or a speed output waveform oscillates in a constant cycle. The oscillation frequency refers to a frequency when a position output waveform or a speed output waveform oscillates in a constant cycle. The oscillation amplitude refers to amplitude when a position output waveform or a speed output waveform oscillates in a constant cycle.

Furthermore, the torque effective value refers to an effective value of a torque within a predetermined time after a position command or a speed command starts.

Next, a step of generating waveform data is executed, and waveform data are generated from the data extracted in step S5 (step S6). The waveform data generated in step S6 are converted into a waveform image and the waveform image is displayed on display 21. That is to say, waveform data generating section 227 generates waveform data by using the data extracted in relational data extraction section 226. Then, display data generating section 243 generates display data by using the waveform data, and an image corresponding to the display data is displayed on display 21.

Figure 6:
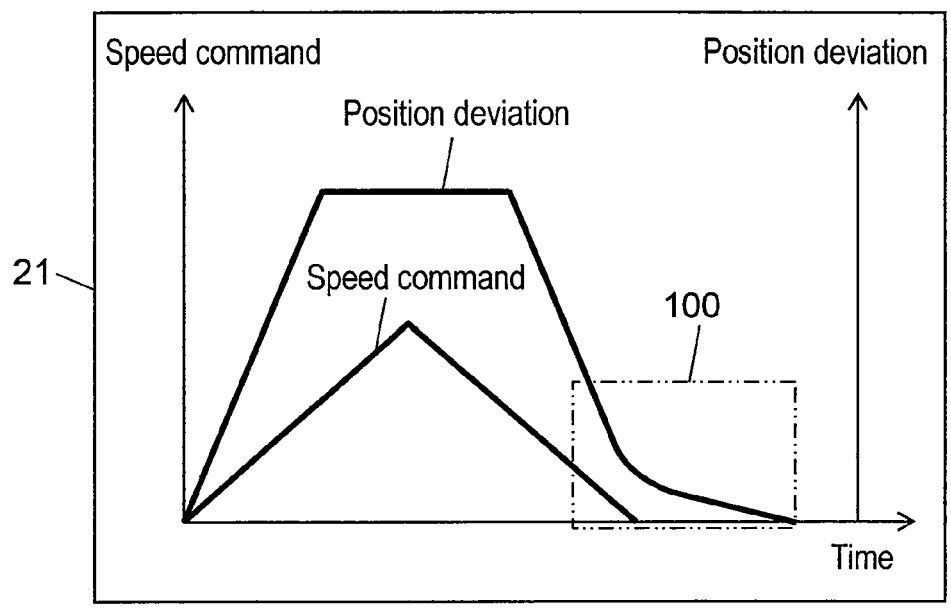
FIG. 6 is a graph showing an example of a displayed image when position control is carried out and a setting time is selected as an evaluation index.

FIG. 6 is a graph showing an example of a displayed image when position control is carried out and a setting time is selected as an evaluation index. As shown in FIG. 6, the waveform image generated in step S6 is displayed on display 21. FIG. 6 shows an example of a waveform of a speed command obtained by differentiating a measured position command and a waveform of a position deviation that is a difference between a measured position output and the position command.

Thereafter, predetermined region 100 including a value necessary for calculation of an evaluation value is automatically cut out from the waveform data generated in step S6 (step S7). Then, a waveform image in the cut-out region is displayed in a graph on display 21 (step S8). That is to say, region cut-out section 228 cuts out predetermined region 100 from the waveform data generated by waveform data generating section 227, and graph displaying section 229 displays cut-out predetermined region 100 in a graph.

Figure 7:
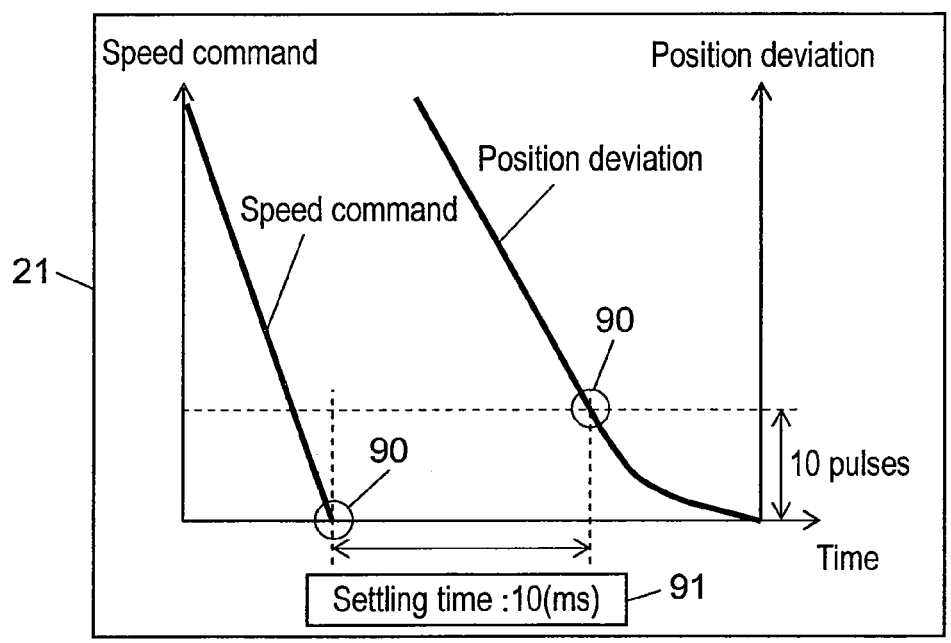
FIG. 7 is a graph showing an image of a waveform in a region cut out from the image of FIG. 6.

FIG. 7 is a graph showing an image of a waveform in a region cut out from the image of FIG. 6 in step S7. Herein, in this exemplary embodiment, since the settling range is made to be 10 pulses, a region including at least the settling range is cut out in step S7.

When a graph is displayed on display 21 in step S8, a coordinate of a value used for calculation of an evaluation value is read out (step S9). Then, mark 90 is additionally displayed on the value to be used for calculation of the evaluation value of the graph displayed in step S8 (step S10). Note here that in this exemplary embodiment, as shown in FIG. 7, mark 90 is additionally displayed on a point of 0 (r/min) in data of the speed command and on a point of 10 (pulse) in data of the position deviation as the values to be used for calculation of the evaluation value.

Next, a calculation step of calculating the evaluation value of the evaluation index based on the extracted data is executed (step S11). Thus, the evaluation value of the selected evaluation index is calculated. That is to say, evaluation value calculation section 240 calculates the evaluation value of the selected evaluation index by using the extracted data.

Then, a display step of displaying the evaluation value calculated in the calculation step on display 21 is executed (step S12). Thus, as shown in FIG. 7, calculated result 91 of the evaluation value is visually displayed as a numeric value. Therefore, the settling time can be visually shown such that it is easily understandable. Thus, an error of determination by a user can be reduced.

Figure 8:
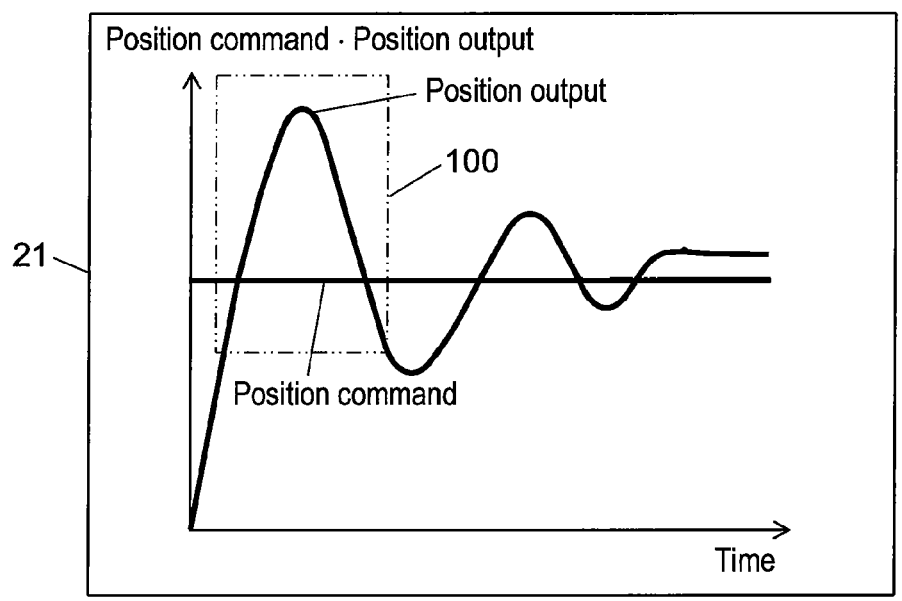
FIG. 8 is a graph showing an example of a displayed image when overshoot is selected as an evaluation index.

Furthermore, FIG. 8 shows an example of a displayed image when overshoot is selected as the evaluation index. As shown in FIG. 8, an image of a waveform data generated in step S6 is displayed on display 21. When such an image is displayed on display 21, predetermined region 100 including a value necessary for calculation of the evaluation value is automatically cut out (step S7). The waveform image in the cut-out region is displayed in a graph on display 21 (step S8). Then, the evaluation value of the evaluation index is calculated based on the extracted data (step S11). The calculated evaluation value is displayed together with the cut-out waveform image on display 21 (step S12).

Figure 9:
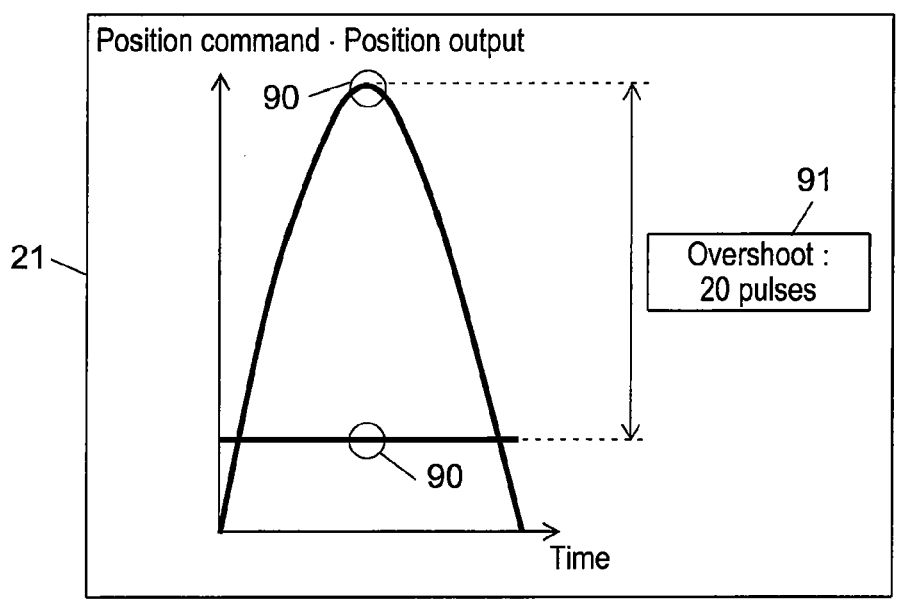
FIG. 9 is a graph showing an image of a waveform in a region cut out from the image of FIG. 8.

FIG. 9 is a graph showing an image of a waveform in the region cut out from the image of FIG. 8 in step S7 in order to obtain overshoot. In this way, also when overshoot is selected, the overshoot can be visually shown such that it is easily understandable. Thus, an error of determination by a user can be reduced.

Figure 10:
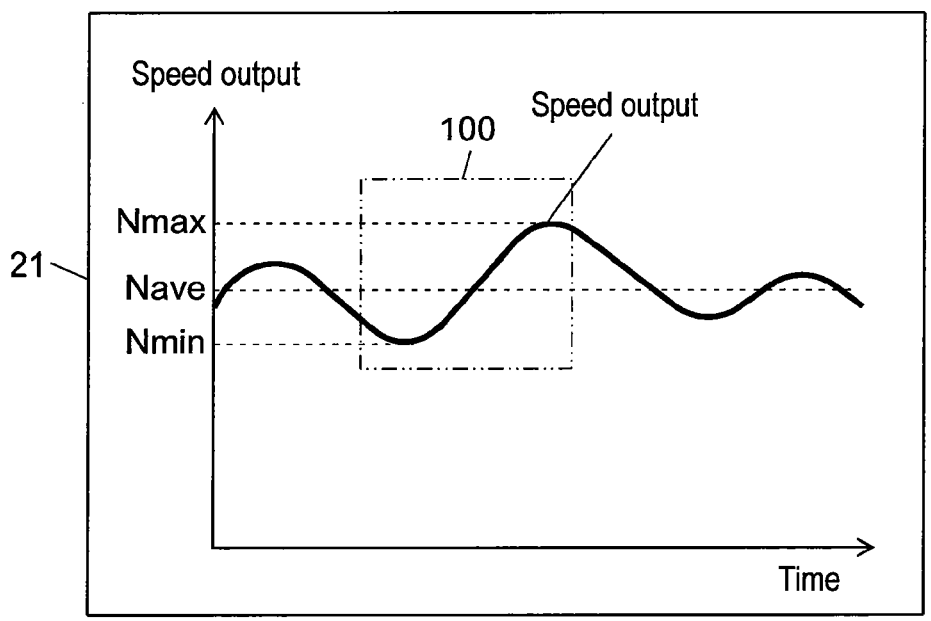
FIG. 10 is a graph showing an example of a displayed image when a speed variation is selected as an evaluation index.

Furthermore, FIG. 10 shows an example of a displayed image when a speed variation is selected as the evaluation index. As shown in FIG. 10, an image of the waveform data generated in step S6 is displayed on display 21. When such an image is displayed on display 21, predetermined region 100 including a value necessary for calculation of the evaluation value is automatically cut out (step S7). The waveform image in the cut-out region is displayed in a graph on display 21 (step S8). Then, the evaluation value of the evaluation index is calculated based on the extracted data (step S11). The calculated evaluation is displayed value together with the cut-out waveform image on display 21 (step S12).

Figure 11:
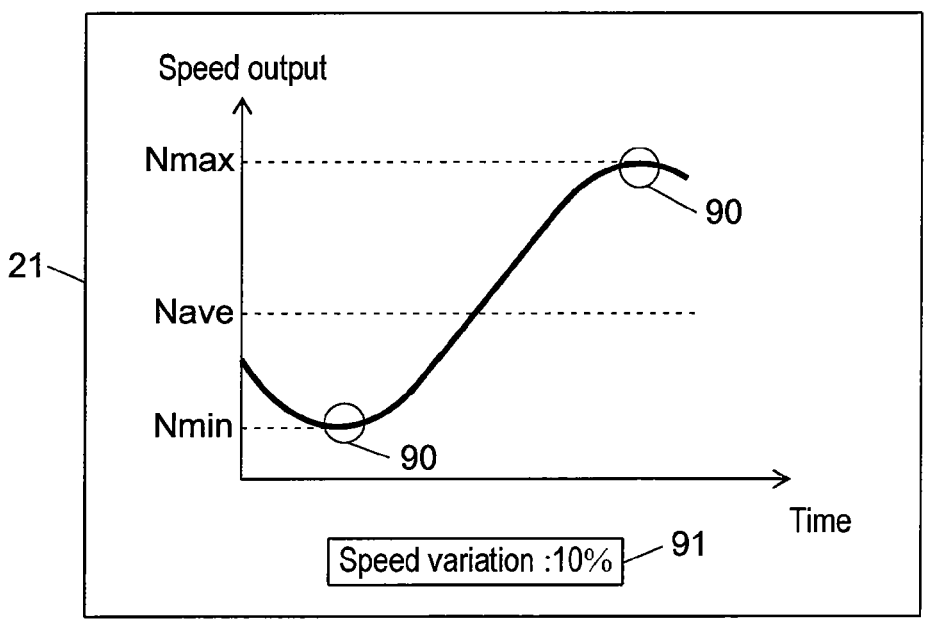
FIG. 11 is a graph showing an image of a waveform in a region cut out from the image of FIG. 10.

FIG. 11 is a graph showing an image of a waveform in the region cut out from the image of FIG. 10 in step S7 in order to obtain a maximum value and a minimum value of the speed output. In this way, also when the speed variation is selected, the speed variation can be visually shown such that it is easily understandable. Thus, an error of determination by a user can be reduced.

Figure 12:
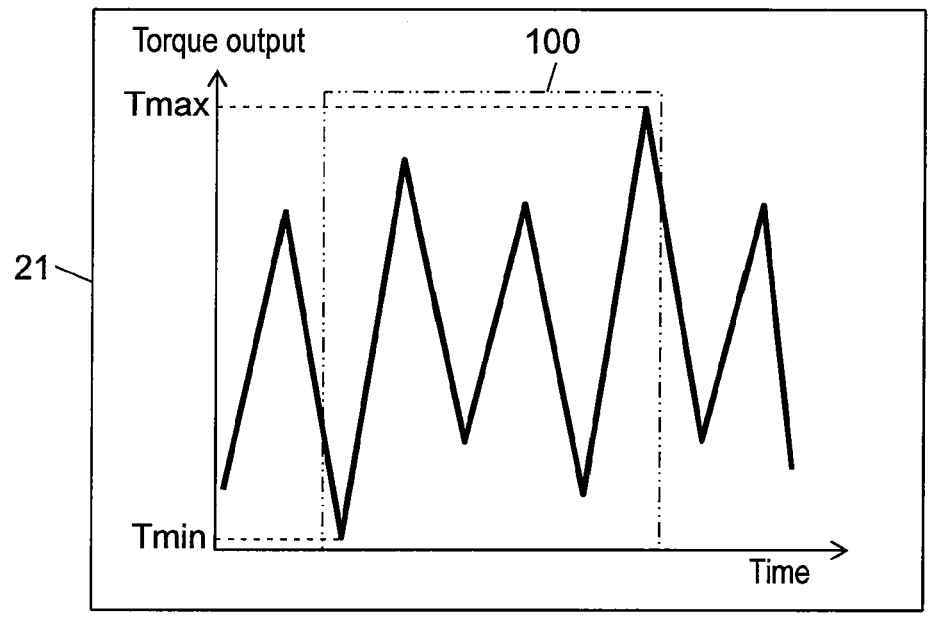
FIG. 12 is a graph showing an example of a displayed image when a torque variation is selected as an evaluation index.

Furthermore, FIG. 12 shows an example of a displayed image when a torque variation is selected as the evaluation index. As shown in FIG. 12, an image of the waveform data generated in step S6 is displayed on display 21. When such an image is displayed on display 21, predetermined region 100 including a value necessary for calculation of the evaluation value is automatically cut out (step S7). The waveform image in the cut-out region is displayed in a graph on display 21 (step S8). Then, the evaluation value of the evaluation index is calculated based on the extracted data (step S11). The calculated evaluation value is displayed together with the cut-out waveform image on display 21 (step S12).

Figure 13:
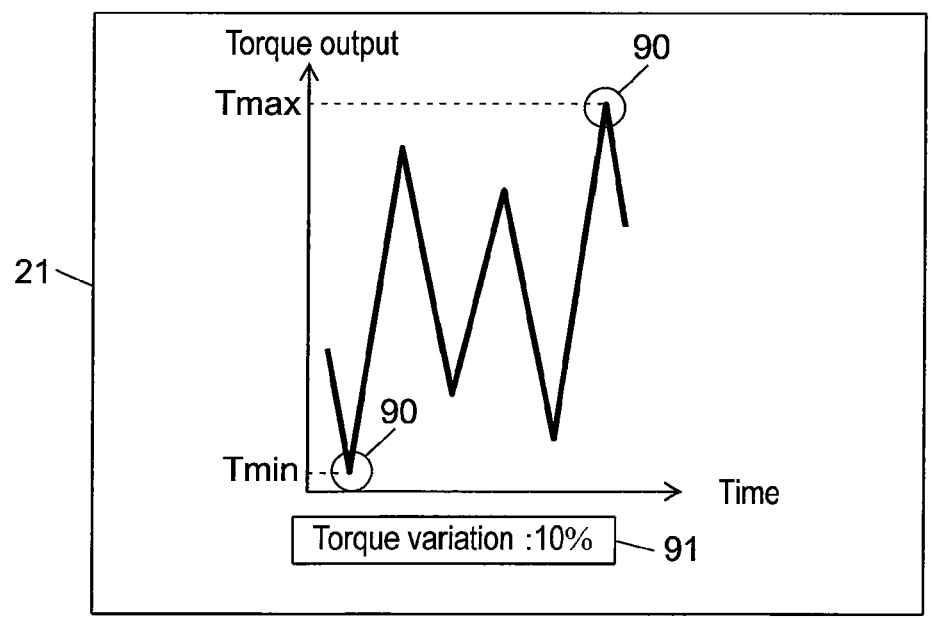
FIG. 13 is a graph showing an image of a waveform in a region cut out from the image of FIG. 12.

FIG. 13 is a graph showing an image of a waveform in the region cut out from the image of FIG. 12 in step S7 in order to obtain a maximum value and a minimum value of the torque output. In this way, also when a torque variation is selected, the torque variation can be visually shown such that it is easily understandable. An error of determination by a user can be reduced.

As mentioned above, the motor control characteristic presentation method of the this exemplary embodiment includes a selection step in which any evaluation index is selected from a plurality of evaluation indices of the control characteristics (step S2); an extraction step of extracting data related to the selected evaluation index from a data group of the motor control system (step S5); a calculation step of calculating an evaluation value of the evaluation index based on the extracted data (step S11); and display step of displaying the calculated evaluation value (step S12). Therefore, according to the motor control characteristic presentation method in this exemplary embodiment, the input/output data necessary for calculation of the evaluation value of the evaluation index is automatically extracted according to the selected evaluation index. Therefore, a user is not required to select input/output data according to the evaluation index, and thereby the evaluation value of the evaluation index can easily be presented.

Furthermore, in the display step, the waveform image generated based on the extracted data is image-displayed, and the evaluation value is numerically displayed, and thereby control characteristics of the motor control system together with the waveform are numerically presented to a user. Therefore, the presentation is visually understandable, and thus the convenience can be enhanced.

Second Exemplary Embodiment

Next, a second exemplary embodiment of the present invention is described with reference to drawings.

Figure 14:
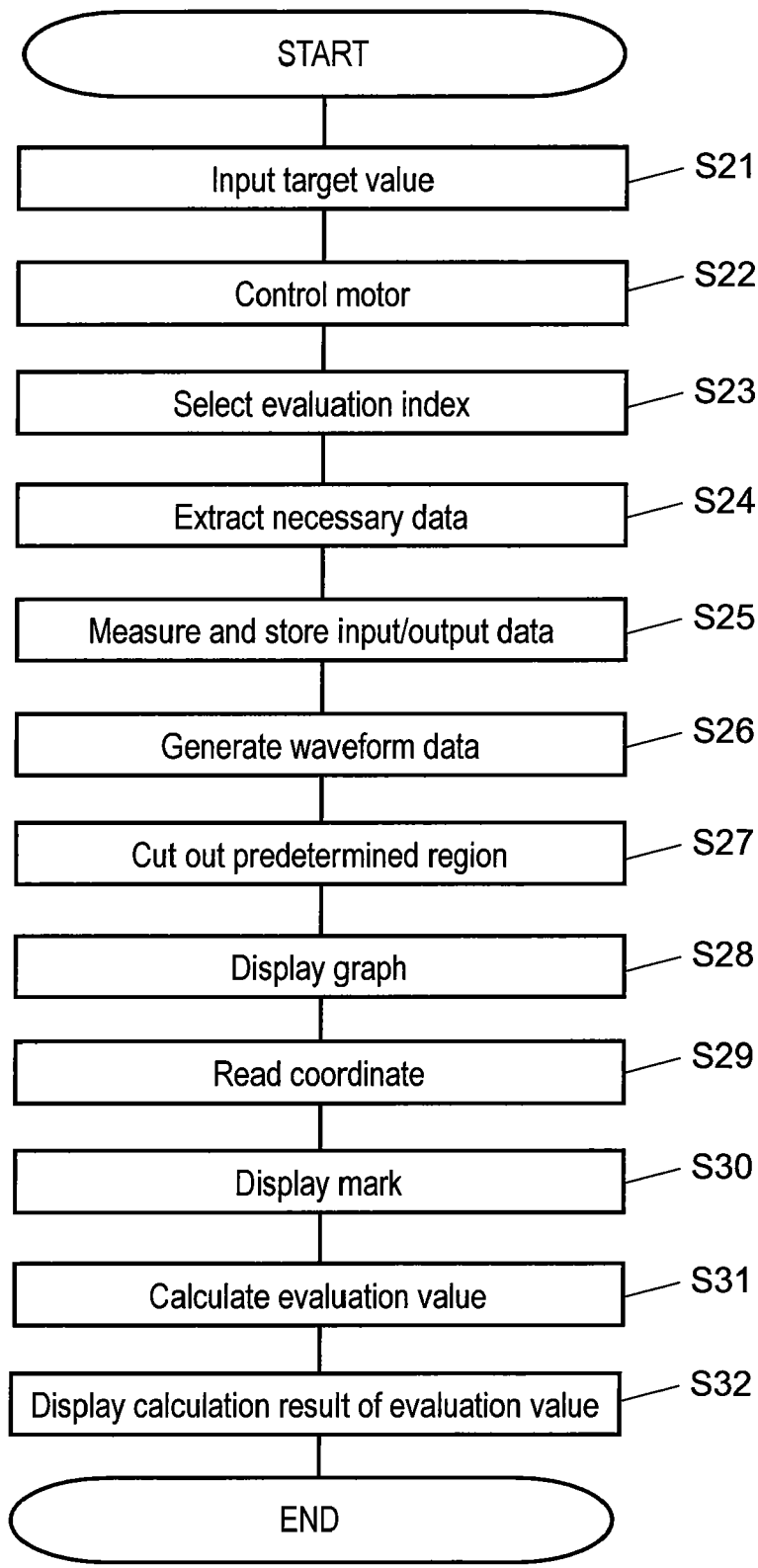
FIG. 14 is a processing flow chart of a motor control characteristic evaluation device in accordance with a second exemplary embodiment of the present invention.

FIG. 14 is a processing flow chart of motor control characteristic evaluation device 22 in accordance with the second exemplary embodiment of the present invention.

In the first exemplary embodiment, necessary data are extracted from stored input/output data. Meanwhile, in this exemplary embodiment, only the input/output data necessary for calculation of an evaluation value are measured and stored.

As shown in FIG. 14, motor control characteristic evaluation device 22 selects an evaluation index (step S23), then extracts necessary data (step S24), and measures and stores input/output data (step S25).

Therefore, motor control characteristic evaluation device 22 in accordance with this exemplary embodiment can measure and store only the data necessary for calculation of the evaluation value of the evaluation index selected as mentioned above. Consequently, the amount of data to be stored in RAM 54 or RAM 222 can be reduced, so that an empty region in RAM 54 or RAM 222 can be increased. Thus, necessary data can be obtained more finely by using the empty region in RAM 54 or RAM 222. Thus, evaluation or control of control characteristics can be carried out more precisely.

Note here that in the above-mentioned exemplary embodiment, calculation of evaluation values of a settling time, overshoot, a rise time, a speed variation and a torque variation is described. Similar to them, evaluation values of evaluation indices such as a delay time, an attenuation ratio, a steady-state deviation, an oscillation period, oscillation frequency and oscillation amplitude, which are shown in Table 1, can be also calculated.

Furthermore, in the above-mentioned display step, the data used for calculation of the evaluation value may be specified as a numerical value. Furthermore, a relation between the data used for calculation of the evaluation value and the calculated values may be also specified. With such a configuration, a desired evaluation index can be presented to a user more clearly.

Figure 15:
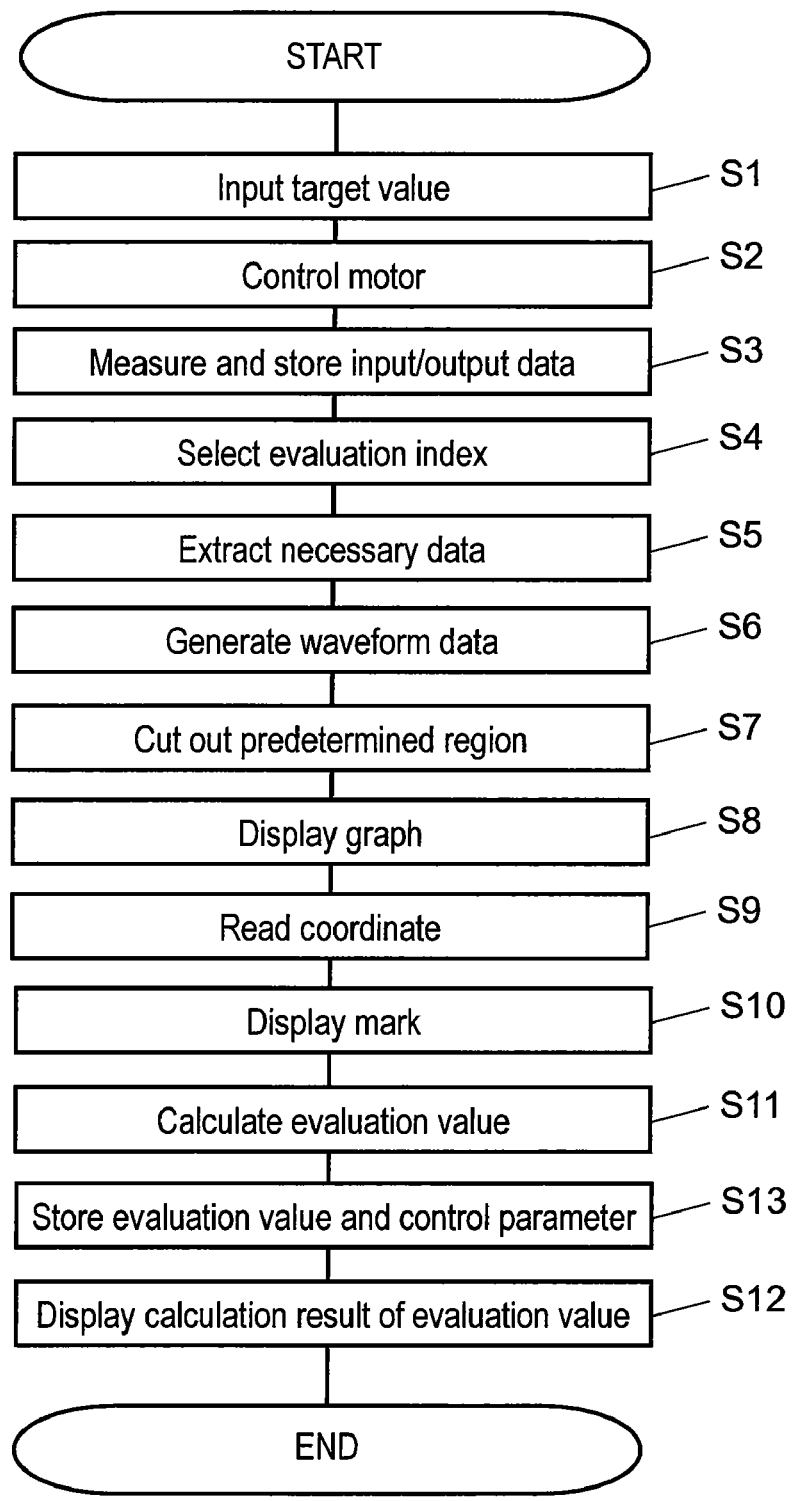
FIG. 15 is a processing flow chart of the motor control characteristic evaluation device and a servo motor control device, which includes a storage step.

In addition, a storage step of storing the calculated evaluation values may be included after the calculation step of calculating the evaluation value of the evaluation index. In this storage step, the evaluation value may be stored in such a manner that it is related to a control parameter of motor control system 101. The control parameter refers to a set value such as gain in the motor control. FIG. 15 is a processing flow chart of motor control characteristic evaluation device 22 and servo motor control device 51 in which such a storage step is included. As shown in FIG. 15, after the calculation step of calculating the evaluation value (step S11), a storage step of storing the calculated evaluation value (step S13) is provided. With such a configuration, the corresponding relation between various setting conditions and evaluation values can be easily understood, thus enhancing the convenience. Furthermore, motor control characteristic evaluation device 22 may be provided with writable nonvolatile storage units, for example, a hard disk, a flash memory, a card memory, or the like. In such a storage unit, an evaluation value, a control parameter, further data used for the evaluation value may be stored in, for example, a file format. With such a configuration, since measurement data for each calculation of the evaluation value are recorded and stored, the measurement data can be easily used in later analysis. The convenience can be further enhanced.

Furthermore, the selection step, the extraction step, the calculation step, and the display step may be carried out a plurality of times as in loop processing. Furthermore, an analysis step of calculating an analytic value based on the evaluation values calculated a plurality of times, and an analytic value display step of displaying the analytic value may be added. Furthermore, such an analytic value may include at least one of an average value that is an average of evaluation values calculated a plurality of times, an effective value of the evaluation value, and a maximum value, a minimum value, a standard deviation value, and a dispersion value, which respectively show the maximum, minimum, standard deviation and dispersion of the evaluation value. Furthermore, an analytic value storage step of storing the calculated analytic value may be included. In this analytic value storage step, the analytic value may be stored in such a manner that it is related to the control parameter of motor control system 101. Furthermore, at this time, the analytic value and the like may be recorded and stored in the above-mentioned writable nonvolatile storage unit.

Figure 16:
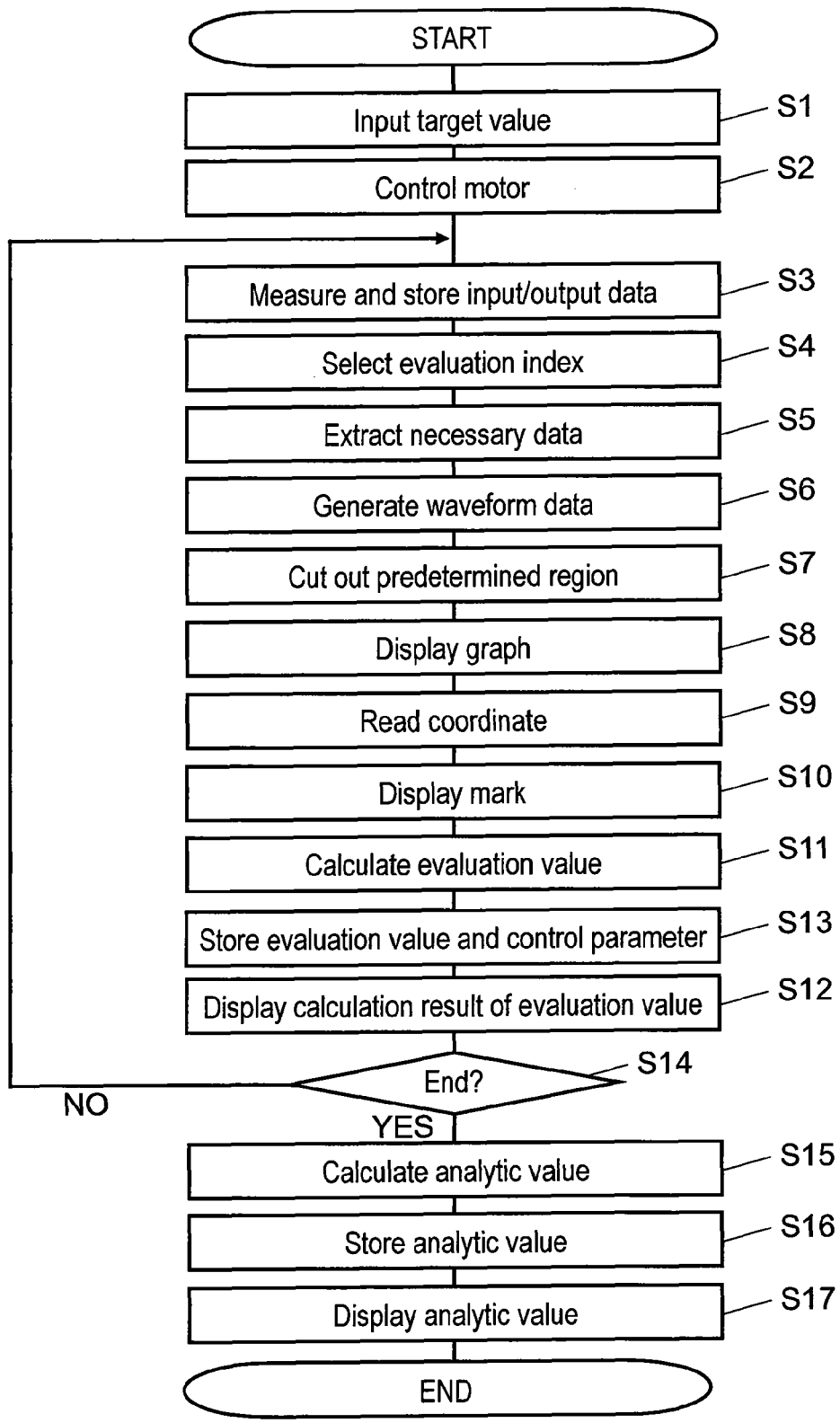
FIG. 16 is a processing flow chart of a motor control characteristic evaluation device and a servo motor control device, in which loop processing is carried out and which includes an analysis step, an analysis display step, and an analytic value storage step.

FIG. 16 is a processing flow chart of motor control characteristic evaluation device 22 and servo motor control device 51, in which loop processing is carried out and which includes an analysis step, an analysis display step, and an analytic value storage step. As shown in FIG. 16, it is determined whether or not processing of calculating or displaying an evaluation value is ended (step S14). When the processing is not ended, the processing returns to step S3 and the processing is executed again. In this way, until an instruction to end the processing is issued, processing from step S3 to step S12 is repeated. Furthermore, when the ending is notified, firstly, based on the evaluation value calculated a plurality of times, the analysis step of calculating an analytic value is executed (step S15). Next, an analytic value storage step of storing the calculated analytic value is executed (step S16). Then, the analytic value display step of displaying the analytic value is executed (step S17). Such a configuration can further enhance the convenience.

Furthermore, FIG. 16 shows a configuration example including one loop processing of executing the analysis step after loop processing, but a plurality of loop processing may be included. FIG. 17 is another processing flow chart of motor control characteristic evaluation device 22 and servo motor control device 51, in which loop processing is carried out and which includes an analysis step, an analysis display step, and an analytic value storage step. Processing shown in FIG. 17 further includes a determination step of determining whether or not processing of calculating or displaying an analytic value is ended (step S18), and when the processing of calculating an analytic value and the like is not ended, the processing returns to step S3 and processing is executed again. Thus, processing of continuously displaying the calculated results of the analytic values and the like can be carried out.

Furthermore, when the above-mentioned loop processing is carried out, a list image displaying function of sequentially displaying resultant evaluation values or analytic values for each loop in a list on display 21 may be provided. Thus, processing results can be sequentially shown and the convenience can be further enhanced.

INDUSTRIAL APPLICABILITY

A motor control characteristic evaluation device in accordance with the present invention can easily obtain an evaluation value of an evaluation index for evaluating control characteristics, and is useful as a motor control characteristic evaluation device which presents evaluation indices of control characteristics and evaluation values thereof in a motor control system including a subject such as a motor to be controlled and a controller for controlling the subject, and as a method of presenting the motor control characteristics.

The invention claimed is:

1. A motor control characteristic evaluation device having a function of presenting control characteristics of a motor control system, comprising:
   an evaluation index selection section in which any evaluation index is selected from a plurality of evaluation indices of the control characteristics and which outputs selection information indicating the selected evaluation index;
   a relational data extraction section for extracting data related to the selected evaluation index from a data group of the motor control system based on the selection information;
   an evaluation value calculation section for calculating an evaluation value of the evaluation index based on the extracted data; and
   a display control section for displaying the calculated evaluation value on a display.

2. The motor control characteristic evaluation device of claim 1,
   wherein the display control section image-displays a waveform image generated based on the data extracted in the relational data extraction section, and numerically displays the evaluation value, on the display.

3. A motor control characteristic presentation method of presenting control characteristics of a motor control system, the method comprising:
   allowing any evaluation index to be selected from a plurality of evaluation indices of the control characteristics;
   extracting data related to the selected evaluation index from a data group of the motor control system;
   calculating an evaluation value of the evaluation index based on the extracted data; and
   displaying the calculated evaluation value on a display.

4. The motor control characteristic presentation method of claim 3,
   wherein the selecting selects one evaluation index from the plurality of evaluation indices.

5. The motor control characteristic presentation method of claim 3,
   wherein the selecting selects one or more evaluation indices from the plurality of evaluation indices.

6. The motor control characteristic presentation method of claim 3,
   wherein the evaluation indices include at least one of a command time, a settling time, a cycle time, a rise time, a delay time, a number of times at which a position is outside a settling range, a number of times at which a speed is outside a settling range, overshoot, an attenuation ratio, a steady-state deviation, a speed variation, a torque variation, an oscillation period of an output waveform, an oscillation frequency of an output waveform, an oscillation amplitude of an output waveform, and a torque effective value.

7. The motor control characteristic presentation method of claim 3,
   wherein the displaying image-displays a waveform image generated based on the data extracted in the extracting and numerically displays the evaluation value.

8. The motor control characteristic presentation method of claim 7,
   wherein the displaying further comprises specifying data used for calculation of the evaluation value on the waveform image.

9. The motor control characteristic presentation method of claim 7,
   wherein the displaying further comprises specifying a relation between the data used for calculation of the evaluation value and the calculated evaluation value on the waveform image.

10. The motor control characteristic presentation method of claim 3, further comprising storing the calculated evaluation value,
    wherein the storing stores the evaluation value in such a manner that the evaluation value is related to a control parameter of the motor control system.

11. The motor control characteristic presentation method of claim 3,
    wherein the selecting, the extracting, the calculating, and the displaying are carried out a plurality of times.

12. The motor control characteristic presentation method of claim 11, further comprising:
    analyzing by calculating an analytic value based on the evaluation values calculated a plurality of times, and displaying the analytic value.

13. The motor control characteristic presentation method of claim 12,
    wherein the analytic value includes at least one of an average value, an effective value, a maximum value, a minimum value, a standard deviation, and dispersion.

14. The motor control characteristic presentation method of claim 13, further comprising storing the calculated analytic value,
    wherein the storing of the analytic value stores the analytic value in such a manner that the analytic value is related to a control parameter of the motor control system.

* * * * *